United States Patent
Bao et al.

(10) Patent No.: US 12,295,060 B2
(45) Date of Patent: May 6, 2025

(54) DATA RECEIVING METHOD, DATA SENDING METHOD, TERMINAL, AND NETWORK SIDE DEVICE

(71) Applicant: VIVO MOBILE COMMUNICATION CO., LTD., Guangdong (CN)

(72) Inventors: Wei Bao, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 352 days.

(21) Appl. No.: 17/702,672

(22) Filed: Mar. 23, 2022

(65) Prior Publication Data

US 2022/0217810 A1    Jul. 7, 2022

Related U.S. Application Data

(63) Continuation of application No. PCT/CN2020/117717, filed on Sep. 25, 2020.

(30) Foreign Application Priority Data

Sep. 26, 2019  (CN) .......................... 201910920203.5

(51) Int. Cl.
*H04W 76/27* (2018.01)
*H04W 74/0833* (2024.01)

(52) U.S. Cl.
CPC ....... *H04W 76/27* (2018.02); *H04W 74/0833* (2013.01)

(58) Field of Classification Search
CPC .......................... H04W 76/27; H04W 74/0833
USPC .......................................................... 370/329
See application file for complete search history.

(56) References Cited

U.S. PATENT DOCUMENTS

| 2018/0324869 A1* | 11/2018 | Phuyal .................. H04W 76/10 |
| 2019/0104470 A1* | 4/2019 | Johansson ......... H04W 52/0216 |
| 2019/0223221 A1 | 7/2019 | Johansson et al. |
| 2019/0350037 A1 | 11/2019 | Lee et al. |
| 2020/0022044 A1 | 1/2020 | Kim et al. |
| 2020/0068547 A1 | 2/2020 | Li et al. |

(Continued)

FOREIGN PATENT DOCUMENTS

| CN | 110063085 A | 7/2019 |
| CN | 110235513 A | 9/2019 |
| CN | 111565459 A | 8/2020 |

(Continued)

OTHER PUBLICATIONS

First Office Action for Chinese Application No. 201910920203.5, dated Jun. 20, 2022, 10 Pages.

(Continued)

*Primary Examiner* — Hermon Asres
(74) *Attorney, Agent, or Firm* — BROOKS KUSHMAN P.C.

(57) ABSTRACT

A data receiving method, a data sending method, a terminal, and a network side device. The data receiving method is applied to a terminal, and includes: in a case that a network side device needs to perform early data transmission EDT and the terminal is in a radio resource control RRC idle state or an RRC inactive state, in a random access process with the network side device, receiving EDT data sent by the network side device and performing RRC state switching.

15 Claims, 3 Drawing Sheets

(56) References Cited

U.S. PATENT DOCUMENTS

2021/0022072 A1* 1/2021 Young .................... H04W 8/02

FOREIGN PATENT DOCUMENTS

| WO | 2018139888 A1 | 8/2018 |
|----|---------------|--------|
| WO | 2018201483 A1 | 11/2018 |
| WO | 2019031427 A1 | 2/2019 |
| WO | 2019032222 A1 | 2/2019 |
| WO | 2020069103 A1 | 4/2020 |

OTHER PUBLICATIONS

International Search Report and Written Opinion for Application No. PCT/CN2020/117717, dated Dec. 25, 2020, 10 Pages.
Extended European Search Report for Application No. 20868248. 4-1215, dated Sep. 27, 2022, 10 Pages.
3GPP RAN2, "LS on Early Data Transmission," 3GPP TSG SA WG3 (Security) Meeting #89, Agenda item 7.6.14, Nov. 27-Dec. 1, 2017, S3-173019, Prague, Czech Republic, 2 Pages.
First Office Action for Korean Application No. 10-2022-7010624, dated Dec. 5, 2024, 14 Pages.
Huawei "Report of the Email discussion [101#57][NB-IOT/MTC R15] EDT remaining issues" 3GPP TSG-RAN WG2 Meeting#101bis, Sanya, China, Apr. 2018, R2-1805078, 23 Pages.
Ericsson "Corrections and clarifications for MO EDT" 3GPP TSG RAN WG2 Meeting #103bis, Chengdu, China, Oct. 2018, R2-1814333, 11 Pages.

* cited by examiner

DATA RECEIVING METHOD, DATA SENDING METHOD, TERMINAL, AND NETWORK SIDE DEVICE

CROSS-REFERENCE OF RELATED APPLICATIONS

This is a continuation application of International Application No. PCT/CN2020/117717 filed on Sep. 25, 2020, which claims priority to Chinese Patent Application No. 201910920203.5, filed on Sep. 26, 2019, which are hereby incorporated by reference in their entireties.

TECHNICAL FIELD

The present disclosure relates to the field of communications technologies, and in particular, to a data receiving method, a data sending method, a terminal, and a network side device.

BACKGROUND

In the later stage of long term evolution (Long Term Evolution, LTE) studies, a fast transmission method for small data is introduced and is mainly applied to terminals of machine type communication (Machine Type Communication, MTC) and cellular-based narrowband Internet of Things (NarrowBand Internet of Things, NB-IOT). A typical scenario is automatic reporting of water meters. Data transmission is characterized by that a data packet is sent in about 12 hours and has a size of about one hundred to several hundred bytes. An early data transmission (Early Data Transmission, EDT) technology is introduced in LTE, to efficiently transmit such sparsely sent small data and avoid radio resource control (Radio Resource Control, RRC) state switching and RRC signaling overheads. This technology is first applied to uplink, so that user equipment (User Equipment, UE, which is also called terminal) can complete data transmission in an idle state (Idle) and an inactive state (Inactive) without performing RRC state switching. Later, it is found that downlink also has a similar data transmission requirement. Therefore, a downlink (Downlink, DL) EDT is introduced. However, there is no solution to how to transmit DL EDT data.

SUMMARY

Embodiments of the present disclosure provide a data receiving method, a data sending method, a terminal, and a network side device.

According to a first aspect, some embodiments of the present disclosure provide a data receiving method, applied to a terminal and including:

in a case that a network side device needs to perform early data transmission EDT and the terminal is in a radio resource control RRC idle state or an RRC inactive state, in a random access process with the network side device, receiving EDT data sent by the network side device and performing RRC state switching.

According to a second aspect, some embodiments of the present disclosure further provide a data sending method, applied to a network side device and including:

in a case that a network side device needs to perform early data transmission EDT and a terminal is not in a radio resource control RRC idle state or an RRC inactive state, in a random access process with the terminal, sending EDT data to the terminal and instructing the terminal to perform RRC state switching.

According to a third aspect, some embodiments of the present disclosure further provide a terminal, including:

an execution module, configured to: in a case that a network side device needs to perform early data transmission EDT and the terminal is in a radio resource control RRC idle state or an RRC inactive state, in a random access process with the network side device, receive EDT data sent by the network side device and performing RRC state switching.

According to a fourth aspect, some embodiments of the present disclosure further provide a terminal, including: a memory, a processor, and a computer program stored in the memory and executable on the processor, where when the computer program is executed by the processor, the steps of the data receiving method are implemented.

According to a fifth aspect, some embodiments of the present disclosure further provide a network side device, including:

a sending module, configured to: in a case that a network side device needs to perform early data transmission EDT and a terminal is not in a radio resource control RRC idle state or an RRC inactive state, in a random access process with the terminal, send EDT data to the terminal and instruct the terminal to perform RRC state switching.

According to a sixth aspect, some embodiments of the present disclosure further provide a network side device, including: a memory, a processor, and a computer program stored in the memory and executable on the processor, where when the computer program is executed by the processor, the steps of the foregoing data sending method are implemented.

According to a seventh aspect, some embodiments of the present disclosure further provide a computer-readable storage medium, where the computer-readable storage medium stores a computer program, and when the computer program is executed by a processor, the steps of the foregoing data receiving method or the foregoing data sending method are implemented.

Beneficial effects of the present disclosure are as follows:

DETAILED DESCRIPTION

To make the objects, technical solutions, and advantages of the present disclosure clearer, the following describes the present disclosure in detail with reference to the accompanying drawings and specific embodiments.

In the description of the embodiments of the present disclosure, some concepts used in the following description are explained first.

Efficient transmission of small data is characterized by that radio resource control (Radio Resource Control, RRC) state switching and RRC signaling overheads required to transmit small data are avoided for user equipments (User Equipment, UE, also called terminal) in a disconnected state, and small data is transmitted through a very simple signaling process. In the long term evolution (Long Term Evolution, LTE) stage, two solutions of a control plane (Control Plane, CP) and a user plane (User Plane, UP) for uplink (UL) are introduced in early data transmission (Early Data Transmission, EDT).

Figure 1:
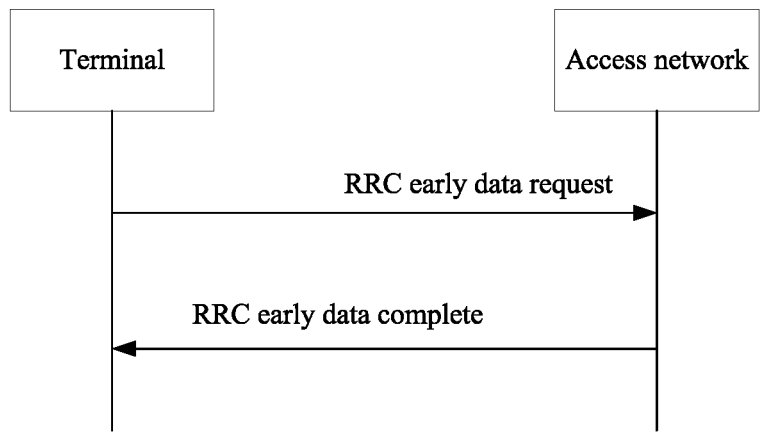
FIG. 1 is a schematic diagram of a typical process of a control plane (Control Plane, CP) of uplink (Uplink, UL) EDT.

The CP solution is characterized by that RRC signaling piggybacks transmission of small data to avoid setting up a data radio bearer (DRB). Uplink user data is directly attached to an uplink RRC early data request (RRC Early Data Request) message in a form similar to a non-access stratum (NAS) message for transmission. Downlink user data may be optionally attached to a downlink RRC early data complete (RRC Early Data Complete) message in a form similar to a NAS message for transmission. There is no need to enter an RRC connected state, and all messages are sent on a signaling radio bearer 0 (SRB0) based on a default configuration. A radio link control (Radio Link Control, RLC) transparent mode (TM) does not support segmentation. A typical UL EDT CP process is shown in FIG. 1.

The above describes the RRC process corresponding to the EDT solution. The effect of the EDT process on a medium access control (Medium Access Control, MAC) layer is mainly the impact on a random access process. According to the original random access process, Msg1 sends a preamble (preamble) for timing advance (Timing Advance, TA) measurement and request, Msg2 allocates an uplink grant (UL grant) and a TA, Msg3 transmits an uplink common control channel (Common Control CHannel, CCCH) and is generally an RRC connection setup request or an RRC connection recovery request in this case, and Msg4 performs contention resolution. In EDT, because data needs to be transmitted without state switching, user data is directly sent in Msg3. Compared with the traditional Msg3, Msg3 for the EDT requires a larger UL grant to sufficiently carry user data. Therefore, from the time when Msg1 sends the preamble, the traditional random access channel (RACH) and the RACH request for EDT need to be distinguished by the network side, so that the network side can allocate, in Msg2, sufficient resources for the UE for data transmission.

In the RACH process of the corresponding EDT, because Msg3 piggybacks user data for transmission, the subsequent contention resolution time is relatively long. Therefore, a length of a contention resolution timer dedicated to the EDT needs to be used to ensure that the EDT process ends successfully.

There is no implementation for LTE DL EDT in the related art, and some embodiments of the present disclosure provide a data receiving method, a data sending method, a terminal, and a network side device.

Figure 2:
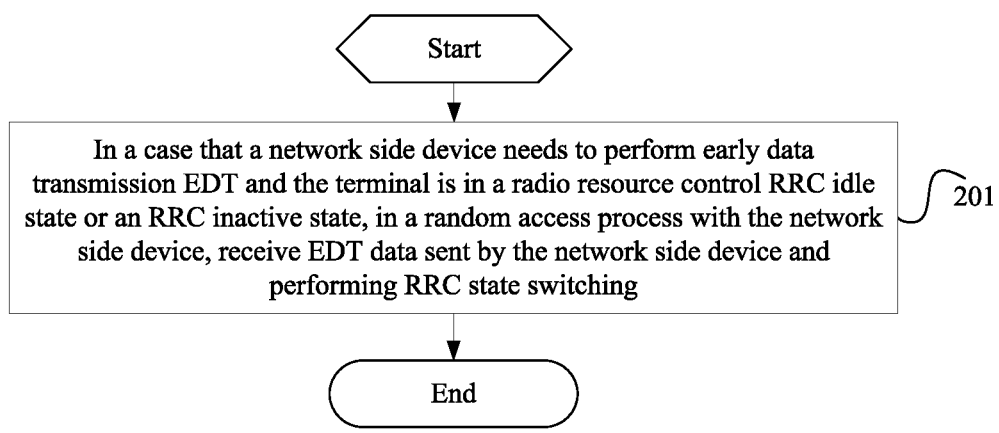
FIG. 2 is a schematic flowchart of a data receiving method according to some embodiments of the present disclosure.

As shown in FIG. 2, some embodiments of the present disclosure provide a data receiving method. The method is applied to a terminal and includes the following steps:

Step 201: In a case that a network side device needs to perform early data transmission EDT and the terminal is in a radio resource control RRC idle state or an RRC inactive state, in a random access process with the network side device, receive EDT data sent by the network side device and performing RRC state switching.

It should be noted that early data transmission (EDT) transmits early small data, that is, EDT data is early small data and is downlink data sent by the network side device to the terminal.

It should be noted that, that the terminal is in the radio resource control (RRC) idle state or the RRC inactive state means that the terminal is not in the RRC connected state.

It should be noted that in the above step, the terminal receives the early small data in the random access process, and at the same time, the terminal performs RRC state switching according to the random access message. RRC state switching mainly refers to that the terminal enters the RRC connected state from the RRC idle state or the RRC inactive state according to the random access message.

That is, when the network side device needs to transmit early small data, the network side device transmits the early small data to the terminal in the random access process performed by the terminal and the network side device, to ensure that the terminal can receive the early small data in time. This can reduce the transmission delay of the early small data, and at the same time enable the terminal to directly enter the RRC connected state, thereby improving the system efficiency and resolving the problem that the random access process and the EDT RRC process cannot work in coordination.

Different transmission methods of the EDT data are specifically described as follows.

Method 1: EDT data is transmitted directly in the last-step signaling of random access.

Specifically, in this case, the specific implementation of step 201 is:

receiving a radio resource control (RRC) connection setup message sent by the network side device;

where the RRC connection setup message (RRC Connection Setup message) carries the EDT data.

That is, in this case, the network side device adds the EDT data to the RRC connection setup message sent to the terminal, and the terminal receives the RRC connection setup message and obtains the EDT data by parsing the RRC connection setup message.

Optionally, the RRC connection setup message carries the EDT data in a manner as follows: the RRC connection setup message includes a non-access stratum dedicated information indicator field (DedicatedInfoNAS field), and the EDT data is located in the non-access stratum dedicated information indicator field.

The specific implementation process in this case is illustrated below with an example.

When the network side device initiates a downlink early small data transmission (DL EDT) process and sends a small amount of data to the terminal, if the terminal is in an idle state at this time, the network side device sends the data through control plane DL EDT. Generally, the network side device explicitly adds a DL EDT indication to a paging message, so that the terminal can initiate a random access process related to early small data transmission. The specific process is as follows:

Step A10: In a case that a core network needs to send downlink data to a terminal and the terminal is currently in an idle state, the core network first determines whether data transmission meets a DL EDT condition, and if the DL EDT condition is met, sends a DL EDT-specific paging request (which means that on the basis of carrying an identifier of the terminal in traditional paging, a DL EDT identifier is added, for example, can be a DL EDT identifier of one bit or can carry a DL data size) to a network side device (for example, eNB/gNB) in a tracking area (tracking area, TA) of the terminal. Satisfying the DL EDT condition can be one or a combination of the following:

B11. The amount of data to be sent by the terminal is less than a threshold.

B12. The service quality of the data to be sent by the terminal meets a requirement.

For example, the delay can tolerate a particular length and above.

B13. The capability of the terminal supports DL EDT.

Step A11: The network side device receives a paging indication message of the core network, determines whether to initiate DL EDT-related paging according to its own state, and if it is necessary to initiate DL EDT paging, adds the DL EDT indication to the paging message, or if it is unnecessary to initiate DL EDT paging, initiates an ordinary paging process. The determining is performed mainly based on one of the following:

B21. Whether the network supports DL EDT.

B22. Whether the resource allows DL EDT.

B23. Whether the network configuration supports DL EDT that satisfies the DL data size.

Step A12: The terminal receives the paging message including the DL EDT indication (if the paging message is a common paging message, the terminal initiates a process according to the existing procedure).

Step A13: The terminal initiates a random access process.

Optionally, if the terminal selects a 4-step random access (4-step RACH) process, the terminal selects an EDT-related preamble (preamble) to initiate the random access message 1 (Msg1) process.

Optionally, if the terminal selects a 2-step random access (2-step RACH) process, the terminal selects a physical uplink shared channel (PUSCH) resource size and a corresponding preamble that match an uplink message (for example, an authentication message, identity information, and/or an RRC early data request (RRC Early Data Request) of the terminal is required) size of the terminal, to initiate the MsgA process.

Step A14: The network side device receives the Msg1 or the MsgA of the terminal.

For the 2-step and 4-step random access processes, specific execution processes of the network side device are also different, and are specifically as follows:

Optionally, if it is Msg1, the network side device learns through the preamble that the EDT process is required, and the uplink grant (UL grant) allocated to the terminal in the message 2 (Msg2) needs to be larger than that of ordinary random access, to satisfy message (for example, an uplink authentication message, identity information, and/or an RRC early data request) transmission of the terminal.

Optionally, if it is MsgA, the network side device can obtain the identity and authentication information of the terminal from the message. If there is authentication information, the authentication information is sent to the core network for authentication. After authentication succeeds, the network side device obtains terminal data from the core network according to the identity of the terminal. At this time, if the terminal needs to enter the connected state based on downlink data of the terminal (for example, a large amount of downlink data arrives, which is not suitable for transmission only through DL EDT) or other conditions (for example, the terminal needs to trigger a new service, such as voice or video), the network side sends an RRC connection setup message that piggybacks a small amount of data to the terminal through MsgB.

Step A15: The terminal side receives the Msg2 or MsgB message sent by the network side device.

Optionally, if it is Msg2, the terminal obtains timing advance (Timing Advance, TA) information and an UL grant in Msg2, and organizes transmission of message 3 (Msg3). Msg3 information is similar to information sent on the PUSCH in the MsgA, and can include authentication message, identity information, and/or an RRC early data request of the terminal.

Optionally, when the terminal receives the MsgB, the terminal parses the RRC connection setup message and the data therein, and performs data processing and connection setup operations. The 2-step RACH process ends. At the same time, the transmission of the predetermined data is completed and the terminal switches to the RRC connected state.

Step A16: The network side device receives the Msg3 message.

It should be noted that step A16 continues to be executed in only the 4-step RACH process.

The network side device parses the Msg3 message, and can obtain the identity and authentication information of the terminal from the message. If there is authentication information, the authentication information is sent to the core network for authentication. After authentication succeeds, the network side device obtains terminal data from the core network according to the identity of the terminal. At this time, if the terminal needs to enter the connected state based on downlink data of the terminal (for example, a large amount of downlink data arrives, which is not suitable for transmission only through DL EDT) or other conditions (for example, the terminal needs to trigger a new service, such as voice or video), the network side sends an RRC connection setup message that piggybacks a small amount of data to the terminal through Msg4. For example, the DedicatedInfo-NAS field is added to the message, and this field is optional and used for piggybacking downlink early data.

Step A17. The terminal receives the Msg4 message of the network.

The terminal receives the Msg4, parses the RRC connection setup message and the data therein, and performs data processing and connection setup operations. The 4-step RACH process ends. The transmission of the predetermined data is completed and the terminal switches to the RRC connected state. At this point, the 4-step RACH process ends.

It should be noted that the above implementation process solves the problem that the random access process and the EDT RRC process cannot work in coordination. The EDT data is directly sent in the RRC connection setup message, so that a small amount of data is transmitted, and the terminal can enter the RRC connected state from the RRC idle state or the RRC inactive state, which reduces the transmission delay of early small data and improves the system efficiency. Besides, this data field is optional and does not affect the existing normal process.

Method 2: The last-step signaling of random access and the RRC early data complete message are sent together.

Specifically, in this case, the specific implementation of step 201 is as follows:

receiving an RRC connection setup message and an RRC early data complete message that are sent together by the network side device;

where the RRC early data complete message carries the EDT data.

It should be noted that this situation means that the network side device sends the RRC connection setup message and the RRC early data complete message together to the terminal, and the terminal performs subsequent operations according to the received messages.

Specifically, the specific behavior of receiving the EDT data sent by the network side device and performing RRC state switching includes:

obtaining the EDT data in the RRC early data complete message, skipping performing an operation of entering an idle state, and performing state switching according to the RRC connection setup message.

For example, in this case, the terminal does not perform the operation of resetting the medium access control (MAC) entity, that is, the terminal cannot enter the idle state according to the RRC early data complete message.

It should be noted that, in some cases, the terminal may first obtain the EDT data in the RRC early data complete message and skip performing the operation of entering the idle state, and then perform the operation of performing state switching according to the RRC connection setup message. In some cases, the terminal may first perform the operation of performing state switching according to the RRC connection setup message, and then obtain the EDT data in the RRC early data complete message and skip performing the operation of entering the idle state.

It should be noted that, in this case, the RRC connection setup message and the RRC early data complete message may be transmitted together in one of the following cases:

Case 1. The RRC early data complete message of the RRC connection setup message and the RRC early data complete message that are transmitted together precedes the RRC connection setup message.

It should be noted that, in this case, the packet assembly sequence of messages is pre-agreed, and the packet assembly sequence also implicitly indicates the execution sequence of the messages received by the terminal. In this case, the terminal first executes the RRC early data complete message, that is, the terminal first obtains the EDT data according to the RRC early data complete message, but the terminal does not perform the operation of entering the idle state according to the RRC early data complete message, and then the terminal performs the process of entering the connected state according to the RRC connection setup message.

Different from the above method 1 of carrying data in the RRC connection setup message, in this method, the EDT data is carried in the RRC early data complete message, and the RRC connection setup message and the RRC early data complete message are transmitted together, so that a small amount of data is transmitted and the state switching of the terminal is performed. However, the RRC connection setup message makes the terminal enter the RRC connected state, and the RRC early data complete message makes the terminal enter the RRC idle state after parsing out the data. Therefore, sending these two messages together causes confusion and uncertainty to the behavior of the terminal, and the execution sequence needs to be further clarified. In this method, the RRC early data complete message is set to precede the RRC connection setup message, to clarify the execution sequence of the terminal.

The specific implementation process in this case is illustrated below with an example.

Step A20: In a case that a core network needs to send downlink data to a terminal and the terminal is currently in an idle state, the core network first determines whether data transmission meets a DL EDT condition, and if the DL EDT condition is met, sends a DL EDT-specific paging request (which means that on the basis of carrying an identifier of the terminal in traditional paging, a DL EDT identifier is added, for example, can be a DL EDT identifier of one bit or can carry a DL data size) to a network side device (for example, eNB/gNB) in a tracking area (tracking area, TA) of the terminal. Satisfying the DL EDT condition can be one or a combination of the following:

B11. The amount of data to be sent by the terminal is less than a threshold.

B12. The service quality of the data to be sent by the terminal meets a requirement.

For example, the delay can tolerate a particular length and above.

B13. The capability of the terminal supports DL EDT.

Step A21: The network side device receives a paging indication message of the core network, determines whether to initiate DL EDT-related paging according to its own state, and if it is necessary to initiate DL EDT paging, adds the DL EDT indication to the paging message, or if it is unnecessary to initiate DL EDT paging, initiates an ordinary paging process. The determining is performed mainly based on one of the following:

B21. Whether the network supports DL EDT.

B22. Whether the resource allows DL EDT.

B23. Whether the network configuration supports DL EDT that satisfies the DL data size.

Step A22: The terminal receives the paging message including the DL EDT indication (if the paging message is a common paging message, the terminal initiates a process according to the existing procedure).

Step A23: The terminal initiates a random access process.

Optionally, if the terminal selects a 4-step RACH process, the terminal selects an EDT-related preamble to initiate the random access message 1 (Msg1) process.

Optionally, if the terminal selects a 2-step RACH process, the terminal selects a physical uplink shared channel (PUSCH) resource size and a corresponding preamble that match an uplink message (for example, an authentication message, identity information, and/or an RRC early data request (RRC Early Data Request) of the terminal is required) size of the terminal, to initiate the MsgA process.

Step A24: The network side device receives the Msg1 or the MsgA of the terminal.

Optionally, if it is Msg1, the network side device learns through the preamble that the EDT process is required, and the uplink grant (UL grant) allocated to the terminal in the message 2 (Msg2) needs to be larger than that of ordinary random access, to satisfy message (for example, an uplink authentication message, identity information, and/or an RRC early data request) transmission of the terminal.

Optionally, if it is MsgA, the network side device can obtain the identity and authentication information of the terminal from the message. If there is authentication information, the authentication information is sent to the core network for authentication. After authentication succeeds, the network side device obtains terminal data from the core network according to the identity of the terminal. At this time, if the terminal needs to enter the connected state based on downlink data of the terminal (for example, a large amount of downlink data arrives, which is not suitable for transmission only through DL EDT) or other conditions (for example, the terminal needs to trigger a new service, such as voice or video), the network side device sends the RRC early data complete message that piggybacks a small amount of data and the RRC connection setup message together to the terminal in MsgB. It should be noted that the RRC early data complete message is placed in the front in packet assembly, and the RRC connection setup message is placed after the RRC early data complete message, to implicitly indicate the execution sequence to the terminal.

Step A25: The terminal side receives the Msg2 or MsgB message sent by the network side device.

Optionally, if it is Msg2, the terminal obtains timing advance (Timing Advance, TA) information and an UL grant in Msg2, and organizes transmission of message 3 (Msg3). Msg3 information is similar to information sent on the PUSCH in the MsgA, and can include authentication message, identity information, and/or an RRC early data request of the terminal.

Optionally, when the terminal receives the MsgB, the terminal sequentially parses the RRC early data complete message and the RRC connection setup message, and the terminal knows that there are two pieces of signaling for data piggybacking and RRC state switching. Therefore, when the terminal processes the RRC early data complete message, the terminal only processes the data (for example, submits the data in a NAS container to an upper layer), and does not need to perform other operations (for example, does not need to perform operations such as MAC entity reset. It should be noted that operations that need to be performed by the terminal can be clearly specified in the standard, which is different from the traditional way of receiving the RRC early data complete message). Then, the terminal executes the RRC connection setup message to perform the connection setup operation. The 2-step RACH process ends. The transmission of the predetermined data is completed and the terminal switches to the RRC connected state.

Step A26: The network side device receives the Msg3 message.

It should be noted that step A26 continues to be executed in only the 4-step RACH process.

The network side device parses the Msg3 message, and can obtain the identity and authentication information of the terminal from the message. If there is authentication information, the authentication information is sent to the core network for authentication. After authentication succeeds, the network side device obtains terminal data from the core network according to the identity of the terminal. At this time, if the terminal needs to enter the RRC connected state based on downlink data of the terminal (for example, a large amount of downlink data arrives, which is not suitable for transmission only through DL EDT) or other conditions (for example, the terminal needs to trigger a new service, such as voice or video), the network side sends the RRC early data complete message that piggybacks a small amount of data and the RRC connection setup message together to the terminal in Msg4. It should be noted that the RRC early data complete message is placed in the front in packet assembly, and the RRC connection setup message is placed after the RRC early data complete message, to implicitly indicate the execution sequence to the terminal.

Step A27. The terminal receives the Msg4 message of the network.

When the terminal receives the Msg4, the terminal sequentially parses the RRC early data complete message and the RRC connection setup message, and the terminal knows that there are two pieces of signaling for data piggybacking and RRC state switching. Therefore, when the terminal processes the RRC early data complete message, the terminal only processes the data, and does not need to perform other operations of returning to the RRC idle state, for example, does not need to perform operations such as MAC entity reset (It should be noted that operations that need to be performed by the terminal can be clearly specified in the standard, which is different from the traditional way of receiving the RRC early data complete message). Then, the terminal executes the RRC connection setup message to perform the connection setup operation. The 4-step RACH process ends. The transmission of the predetermined data is completed and the terminal switches to the RRC connected state.

It should be noted that the above implementation process solves the problem that the random access process and the EDT RRC process cannot work in coordination. The RRC connection setup message and the RRC early data complete message are sent together to the terminal, and the packet assembly sequence of the two messages implicitly indicates the execution sequence of the two messages to the terminal, so that a small amount of data can be transmitted and the terminal can enter the RRC connected state from the RRC idle state or the RRC inactive state. This reduces the transmission delay of early small data and improves the system efficiency. Besides, the existing signaling format is used in this method and the standard workload is small.

Case 2: The terminal receives message execution sequence indication information sent by the network side device.

The message execution sequence indication information is used to instruct the terminal to first obtain the EDT data in the RRC early data complete message, and then perform state switching according to the RRC connection setup message.

Alternatively, the message execution sequence indication information is used to instruct the terminal to first perform state switching according to the RRC connection setup message, and then obtain the EDT data in the RRC early data complete message.

It should be noted that this case means that the network side device needs to send an indication message to indicate the execution sequence of the RRC connection setup message and the RRC early data complete message. Optionally, the indication information may be located in a MAC packet header or control information of the radio resource control RRC connection setup message and the RRC early data complete message that are sent together.

Case 3: The RRC early data complete message and the RRC connection setup message are marked with different logical channel identifiers.

It should be noted that this case means that two messages are distinguished by using different logical channel identifiers. When the terminal receives the RRC connection setup message and the RRC early data complete message that are sent together, the terminal can determine the execution sequence of the two messages based on the logical channel identifiers.

Case 4: The RRC early data complete message carries first indication information, and the first indication information is used to instruct the terminal to obtain the EDT data according to the RRC early data complete message.

It should be noted that, in this case, only indication information is added to the RRC early data complete message, to instruct the terminal to only obtain the EDT data carried in the RRC early data complete message when executing the RRC early data complete message, and not perform the operation of entering the idle state based on the RRC early data complete message.

It should be noted that the cases 2, 3, and 4 are all explicit indication methods, and the execution sequence is indicated to the terminal by explicitly indicating the execution sequence or specially identifying the RRC early data complete message. The specific implementation process in this case is illustrated below with an example.

Step A30: In a case that a core network needs to send downlink data to a terminal and the terminal is currently in an idle state, the core network first determines whether data transmission meets a DL EDT condition, and if the DL EDT condition is met, sends a DL EDT-specific paging request (which means that on the basis of carrying an identifier of the terminal in traditional paging, a DL EDT identifier is added, for example, can be a DL EDT identifier of one bit or can carry a DL data size) to a network side device (for example, eNB/gNB) in a tracking area (tracking area, TA) of the terminal. Satisfying the DL EDT condition can be one or a combination of the following:

B11. The amount of data to be sent by the terminal is less than a threshold.

B12. The service quality of the data to be sent by the terminal meets a requirement.

For example, the delay can tolerate a particular length and above.

B13. The capability of the terminal supports DL EDT.

Step A31: The network side device receives a paging indication message of the core network, determines whether to initiate DL EDT-related paging according to its own state, and if it is necessary to initiate DL EDT paging, adds the DL EDT indication to the paging message, or if it is unnecessary to initiate DL EDT paging, initiates an ordinary paging process. The determining is performed mainly based on one of the following:

B21. Whether the network supports DL EDT.

B22. Whether the resource allows DL EDT.

B23. Whether the network configuration supports DL EDT that satisfies the DL data size.

Step A32: The terminal receives the paging message including the DL EDT indication (if the paging message is a common paging message, the terminal initiates a process according to the existing procedure).

Step A33: The terminal initiates a random access process.

Optionally, if the terminal selects a 4-step RACH process, the terminal selects an EDT-related preamble to initiate the random access message 1 (Msg1) process.

Optionally, if the terminal selects a 2-step RACH process, the terminal selects a physical uplink shared channel (PUSCH) resource size and a corresponding preamble that match an uplink message (for example, an authentication message, identity information, and/or an RRC early data request (RRC Early Data Request) of the terminal is required) size of the terminal, to initiate the MsgA process.

Step A34: The network side device receives the Msg1 or the MsgA of the terminal.

Optionally, if it is Msg1, the network side device learns through the preamble that the EDT process is required, and the uplink grant (UL grant) allocated to the terminal in the message 2 (Msg2) needs to be larger than that of ordinary random access, to satisfy message (for example, an uplink authentication message, identity information, and/or an RRC early data request) transmission of the terminal.

If it is MsgA, the network side device can obtain the identity and authentication information of the terminal from the message. If there is authentication information, the authentication information is sent to the core network for authentication. After authentication succeeds, the network side device obtains terminal data from the core network according to the identity of the terminal. At this time, if the terminal needs to enter the RRC connected state based on downlink data of the terminal (for example, a large amount of downlink data arrives, which is not suitable for transmission only through DL EDT) or other conditions (for example, the terminal needs to trigger a new service, such as voice or video), the network side sends the RRC early data complete message that piggybacks a small amount of data and the RRC connection setup message together to the terminal in MsgB. Explicit indication is provided in at least one of the following methods:

H11. Indicate the execution sequence to the terminal with explicit content in a data packet or at a header position.

For example, the RRC early data complete message needs to be executed first, and the RRC connection setup message needs to be executed later.

H12. Carry a special indication in the RRC early data complete message, to indicate that only the data of the message needs to be processed and the remaining traditional operations do not need to be performed, or only some operations need to be performed, for example, the operation such as MAC entity reset does not need to be performed (operations that need to be performed by the terminal can be clearly specified in the standard, which is different from the traditional way of receiving the RRC early data complete message).

H13. A logical channel identifier (LCID) can be allocated to the CCCH, which is specially used for the RRC early data complete message for which only data is processed.

Step A35: The terminal side receives the Msg2 or MsgB message sent by the network side device.

Optionally, if it is Msg2, the terminal obtains timing advance (Timing Advance, TA) information and an UL grant in Msg2, and organizes transmission of message 3 (Msg3). Msg3 information is similar to information sent on the PUSCH in the MsgA, and can include authentication message, identity information, and/or an RRC early data request of the terminal.

Optionally, when the terminal receives the MsgB, the terminal sequentially parses the RRC early data complete message and the RRC connection setup message according to the explicitly indicated sequence, and the terminal knows that there are two pieces of signaling for data piggybacking and RRC state switching. Therefore, when the terminal processes the RRC early data complete message, the terminal only processes the data, and does not need to perform other operations of returning to the RRC idle state (for example, does not need to perform operations such as MAC entity reset It should be noted that operations that need to be performed by the terminal can be clearly specified in the standard, which is different from the traditional way of receiving the RRC early data complete message). Then, the terminal executes the RRC connection setup message to perform the connection setup operation. The 2-step RACH process ends. The transmission of the predetermined data is completed and the terminal switches to the RRC connected state.

Alternatively, although no sequence is explicitly indicated and the terminal can arbitrarily execute the RRC early data complete message and the RRC connection setup message, because the RRC early data complete message has a special indication, the terminal only needs to process the data when processing the RRC early data complete message, and does not need to perform another operation of returning to the RRC idle state (for example, does not need to perform operations such as MAC entity reset. It should be noted that operations that need to be performed by the terminal can be clearly specified in the standard, which is different from the traditional way of receiving the RRC early data complete message, and may also be different from the foregoing operation of executing the two messages according to the explicitly indicated sequence).

Alternatively, certainly, the explicit sequence indication and the special identifier carried by the RRC early data complete message may also be received together, and the execution of the terminal is more clear. The RRC early data complete message is executed first and then the RRC connection setup message is executed. Because the RRC early data complete message has a special indication, the terminal only processes the data when processing the RRC early data complete message, and does not need to perform another operation of returning to the RRC idle state (for example, does not need to perform operations such as MAC entity reset. It should be noted that operations that need to be performed by the terminal can be clearly specified in the standard, which is different from the traditional way of receiving the RRC early data complete message). Then, the terminal executes the RRC connection setup message to perform the connection setup operation. The 2-step RACH process ends. The transmission of the predetermined data is completed and the terminal switches to the RRC connected state.

The terminal receives the MsgB. According to different logical channel identifiers used for the RRC early data complete message and the RRC connection setup message, when processing the RRC early data complete message, the terminal only processes the data, and does not need to perform other operations of returning to the RRC idle state (for example, does not need to perform operations such as MAC entity reset. It should be noted that operations that need to be performed by the terminal can be clearly specified in the standard, which is different from the traditional way of receiving the RRC early data complete message). Then, the terminal executes the RRC connection setup message to perform the connection setup operation. The 2-step RACH process ends. The transmission of the predetermined data is completed and the terminal switches to the RRC connected state.

Step A36: The network side device receives the Msg3 message.

It should be noted that step A36 continues to be executed in only the 4-step RACH process.

The network side device parses the Msg3 message, and can obtain the identity and authentication information of the terminal from the message. If there is authentication information, the authentication information is sent to the core network for authentication. After authentication succeeds, the network side device obtains terminal data from the core network according to the identity of the terminal. At this time, if the terminal needs to enter the connected state based on downlink data of the terminal (for example, a large amount of downlink data arrives, which is not suitable for transmission only through DL EDT) or other conditions (for example, the terminal needs to trigger a new service, such as voice or video), the network side sends the RRC early data complete message that piggybacks a small amount of data and the RRC connection setup message together to the terminal in Msg4. Explicit indication is provided in at least one of the following methods:

H21. Indicate the execution sequence to the terminal with explicit content in a data packet or at a header position.

For example, the RRC early data complete message needs to be executed first, and the RRC connection setup message needs to be executed later.

H22. Carry a special indication in the RRC early data complete message, to indicate that only the data of the message needs to be processed and the remaining traditional operations do not need to be performed, or only some operations need to be performed, for example, the operation such as MAC entity reset does not need to be performed (operations that need to be performed by the terminal can be clearly specified in the standard, which is different from the traditional way of receiving the RRC early data complete message).

H23. An LCD can be allocated to the CCCH, which is specially used for the RRC early data complete message for which only data is processed.

Step A37. The terminal receives the Msg4 message of the network.

When the terminal receives the Msg4, the terminal sequentially parses the RRC early data complete message and the RRC connection setup message according to the explicitly indicated sequence, and the terminal knows that there are two pieces of signaling for data piggybacking and RRC state switching. Therefore, when the terminal processes the RRC early data complete message, the terminal only processes the data, and does not need to perform other operations of returning to the RRC idle state (for example, does not need to perform operations such as MAC entity reset. It should be noted that operations that need to be performed by the terminal can be clearly specified in the standard, which is different from the traditional way of receiving the RRC early data complete message). Then, the terminal executes the RRC connection setup message to perform the connection setup operation. The 4-step RACH process ends. The transmission of the predetermined data is completed and the terminal switches to the RRC connected state.

Alternatively, although no sequence is explicitly indicated and the terminal can arbitrarily execute the RRC early data complete message and the RRC connection setup message, because the RRC early data complete message has a special indication, the terminal only needs to process the data when processing the RRC early data complete message, and does not need to perform another operation of returning to the RRC idle state (for example, does not need to perform operations such as MAC entity reset. It should be noted that operations that need to be performed by the terminal can be clearly specified in the standard, which is different from the traditional way of receiving the RRC early data complete message, and may also be different from the foregoing operation of executing the two messages according to the explicitly indicated sequence).

Alternatively, certainly, the explicit sequence indication and the special identifier carried by the RRC early data complete message may also be received together, and the execution of the terminal is more clear. The RRC early data complete message is executed first and then the RRC connection setup message is executed. Because the RRC early data complete message has a special indication, the terminal only processes the data when processing the RRC early data complete message, and does not need to perform another operation of returning to the RRC idle state (for example, does not need to perform operations such as MAC entity reset. It should be noted that operations that need to be performed by the terminal can be clearly specified in the standard, which is different from the traditional way of receiving the RRC early data complete message). Then, the terminal executes the RRC connection setup message to perform the connection setup operation. The 4-step RACH process ends. The transmission of the predetermined data is completed and the terminal switches to the RRC connected state.

The terminal receives the Msg4. According to different logical channel identifiers used for the RRC early data complete message and the RRC connection setup message, when processing the RRC early data complete message, the terminal only processes the data, and does not need to perform other operations of returning to the RRC idle state (for example, does not need to perform operations such as MAC entity reset. It should be noted that operations that need to be performed by the terminal can be clearly specified in the standard, which is different from the traditional way of receiving the RRC early data complete message). Then, the terminal executes the RRC connection setup message to perform the connection setup operation. The 2-step RACH process ends. The transmission of the predetermined data is completed and the terminal switches to the RRC connected state.

It should be noted that the above implementation process solves the problem that the random access process and the EDT RRC process cannot work in coordination. The RRC connection setup message and the RRC early data complete message are sent together to the terminal, and an additional indication is used to explicitly indicate the execution sequence of the two messages to the terminal. A small amount of data is transmitted and the terminal switches to the RRC connected state from the RRC idle state or the RRC inactive state. This reduces the transmission delay of early small data and improves the system efficiency. Besides, in this method, the relevant message format is improved, so that the behavior of the terminal is clearer.

It should be noted that, some embodiments of the present disclosure also provide an early small data transmission method, and the specific implementation process is as follows:

Step A40: In a case that a core network needs to send downlink data to a terminal and the terminal is currently in an idle state, the core network first determines whether data transmission meets a DL EDT condition, and if the DL EDT condition is met, sends a DL EDT-specific paging request (which means that on the basis of carrying an identifier of the terminal in traditional paging, a DL EDT identifier is added, for example, can be a DL EDT identifier of one bit or can carry a DL data size) to a network side device (for example, eNB/gNB) in a tracking area (tracking area, TA) of the terminal. Satisfying the DL EDT condition can be one or a combination of the following:

B11. The amount of data to be sent by the terminal is less than a threshold.

B12. The service quality of the data to be sent by the terminal meets a requirement.

For example, the delay can tolerate a particular length and above.

B13. The capability of the terminal supports DL EDT.

Step A41: The network side device receives a paging indication message of the core network, determines whether to initiate DL EDT-related paging according to its own state, and if it is necessary to initiate DL EDT paging, adds the DL EDT indication to the paging message, or if it is unnecessary to initiate DL EDT paging, initiates an ordinary paging process. The determining is performed mainly based on one of the following:

B21. Whether the network supports DL EDT.
B22. Whether the resource allows DL EDT.
B23. Whether the network configuration supports DL EDT that satisfies the DL data size.

Step A42: The terminal receives the paging message including the DL EDT indication (if the paging message is a common paging message, the terminal initiates a process according to the existing procedure).

Step A43: The terminal initiates a random access process.

Optionally, if the terminal selects a 4-step RACH process, the terminal selects an EDT-related preamble to initiate the random access message 1 (Msg1) process.

Optionally, if the terminal selects a 2-step RACH process, the terminal selects a physical uplink shared channel (PUSCH) resource size and a corresponding preamble that match an uplink message (for example, an authentication message, identity information, and/or an RRC early data request (RRC Early Data Request) of the terminal is required) size of the terminal, to initiate the MsgA process.

Step A44: The network side device receives the Msg1 or the MsgA of the terminal.

For the 2-step and 4-step random access processes, specific execution processes of the network side device are also different, and are specifically as follows:

Optionally, if it is Msg1, the network side device learns through the preamble that the EDT process is required, and the uplink grant (UL grant) allocated to the terminal in the message 2 (Msg2) needs to be larger than that of ordinary random access, to satisfy message (for example, an uplink authentication message, identity information, and/or an RRC early data request) transmission of the terminal.

Optionally, if it is a MsgA message, the network can obtain identity and authentication information of the terminal from the message. If it is found that the terminal needs to switch to the RRC connected state, the RRC connection setup message is directly sent in the MsgB message.

Step A45: The terminal side receives the Msg2 or MsgB message sent by the network side device.

Optionally, if it is Msg2, the terminal obtains timing advance (Timing Advance, TA) information and an UL grant in Msg2, and organizes transmission of message 3 (Msg3). Msg3 information is similar to information sent on the PUSCH in the MsgA, and can include authentication message, identity information, and/or an RRC early data request of the terminal.

Optionally, the terminal receives the MsgB, and sets up an RRC connection according to the content of the RRC Connection Setup message. The 2-step RACH process ends. The network side device sets up a dedicated data bearer for the terminal, and transmits early small data in the dedicated data bearer.

Step A46: The network side device receives the Msg3 message.

It should be noted that step A46 continues to be executed in only the 4-step RACH process.

The network parses the Msg3 message, and can obtain identity and authentication information of the terminal from the message. If it is found that the terminal needs to switch to the RRC connected state, the RRC connection setup message is directly sent in the Msg4 message.

Step A47. The terminal receives the Msg4 message of the network.

Specifically, the terminal receives the Msg4, and sets up an RRC connection according to the content of the RRC Connection Setup message. The 4-step RACH process ends. The network side device sets up a dedicated data bearer for the terminal, and transmits early small data in the dedicated data bearer.

It should be noted that this method is initiated according to the DL EDT process. Subsequently, the network side changes according to the requirement, and the DL EDT process is changed to a normal RRC connection setup process and then data bearer setup and data transmission processes are performed.

In summary, some embodiments of the present disclosure ensure that the random access process and the EDT RRC process work in coordination, improve the efficiency of downlink small data transmission, complete small data transmission and signaling transmission at the same time, reduce the delay to a certain extent, and greatly improve the system efficiency.

Figure 3:
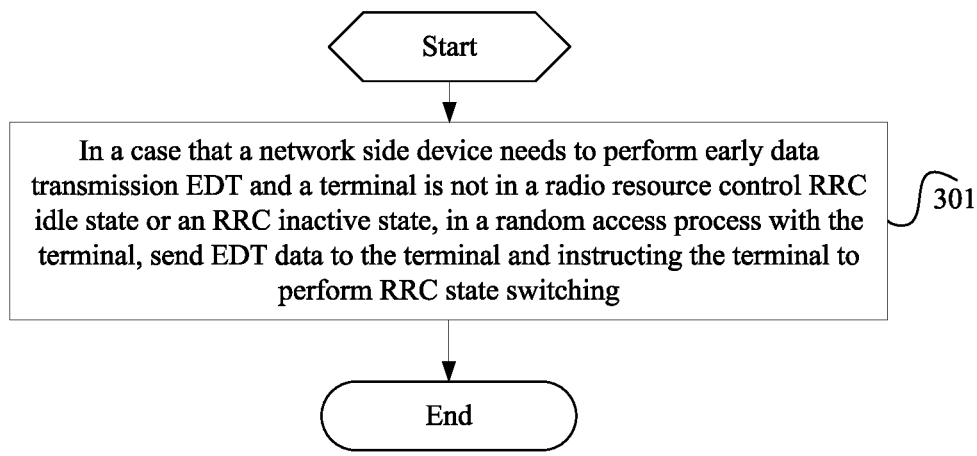
FIG. 3 is a schematic flowchart of a data sending method according to some embodiments of the present disclosure.

As shown in FIG. 3, some embodiments of the present disclosure further provide a data sending method, applied to a network side device and including:

Step 301: In a case that a network side device needs to perform early data transmission EDT and a terminal is not in a radio resource control RRC idle state or an RRC inactive state, in a random access process with the terminal, send EDT data to the terminal and instructing the terminal to perform RRC state switching.

Optionally, the sending the EDT data to the terminal includes:
adding the EDT data to an RRC connection setup message and sending the RRC connection setup message to the terminal.

Further, the RRC connection setup message includes a non-access stratum dedicated information indicator field, and the EDT data is located in the non-access stratum dedicated information indicator field.

Optionally, the sending the EDT data to the terminal includes:
sending the radio resource control RRC connection setup message and an RRC early data complete message together to the terminal;
where the RRC early data complete message carries the EDT data.

Further, the RRC early data complete message precedes the RRC connection setup message.

Further, the data sending method further includes:
sending message execution sequence indication information to the terminal;
where the message execution sequence indication information is used to instruct the terminal to first obtain the EDT data in the RRC early data complete message, and then perform state switching according to the RRC connection setup message; or
the message execution sequence indication information is used to instruct the terminal to first perform state switching according to the RRC connection setup message, and then obtain the EDT data in the RRC early data complete message.

Further, the RRC early data complete message and the RRC connection setup message are marked with different logical channel identifiers.

Further, the RRC early data complete message carries first indication information, and the first indication information is used to instruct the terminal to obtain the EDT data according to the RRC early data complete message.

It should be noted that all descriptions of the network side device in the foregoing embodiment are applicable to the embodiment of the data sending method, and a same technical effect can also be achieved.

Figure 4:
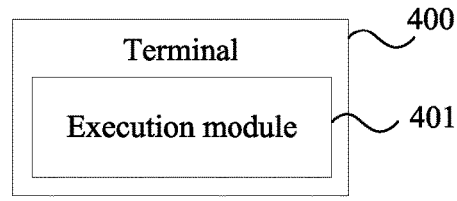
FIG. 4 is a schematic diagram of modules of a terminal according to some embodiments of the present disclosure.

Referring to FIG. 4, some embodiments of this disclosure provide a terminal 400, including:
an execution module 401, configured to: in a case that a network side device needs to perform early data transmission EDT and the terminal is in a radio resource control RRC idle state or an RRC inactive state, in a random access process with the network side device, receive EDT data sent by the network side device and performing RRC state switching.

Optionally, the execution module 401 is configured to:
receive an RRC connection setup message sent by the network side device;
where the RRC connection setup message carries the EDT data.

Further, the RRC connection setup message includes a non-access stratum dedicated information indicator field, and the EDT data is located in the non-access stratum dedicated information indicator field.

Optionally, the execution module 401 is configured to:
receive an RRC connection setup message and an RRC early data complete message that are sent together by the network side device;
where the RRC early data complete message carries the EDT data.

Further, the RRC early data complete message precedes the RRC connection setup message.

Further, the terminal further includes:
an indication receiving module, configured to receive message execution sequence indication information sent by the network side device;
where the message execution sequence indication information is used to instruct the terminal to first obtain the EDT data in the RRC early data complete message, and then perform state switching according to the RRC connection setup message; or
the message execution sequence indication information is used to instruct the terminal to first perform state switching according to the RRC connection setup message, and then obtain the EDT data in the RRC early data complete message.

Further, the RRC early data complete message and the RRC connection setup message are marked with different logical channel identifiers.

Further, the RRC early data complete message carries first indication information, and the first indication information is used to instruct the terminal to obtain the EDT data according to the RRC early data complete message.

Specifically, the execution module 401 is configured to:
obtain the EDT data in the RRC early data complete message, skip performing an operation of entering an idle state, and perform state switching according to the RRC connection setup message.

Further, the implementation in which the terminal skips performing the operation of entering the idle state is specifically:
skipping, by the terminal, an operation of resetting a medium access control MAC entity.

It should be noted that this terminal embodiment is a terminal corresponding to the foregoing data receiving method applied to the terminal. All implementations of the foregoing embodiment are applicable to this terminal embodiment, and a same technical effect can also be achieved.

Figure 5:
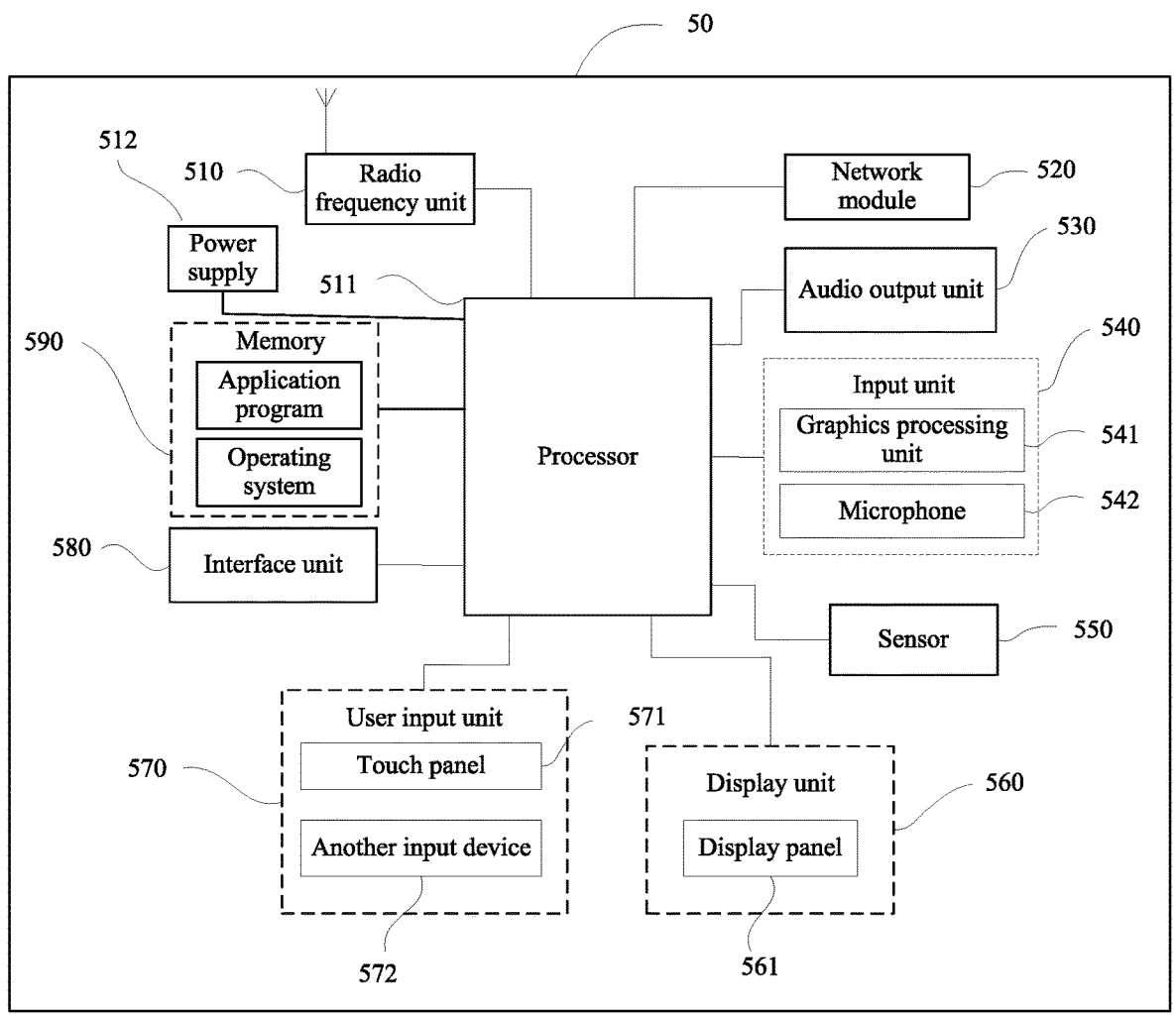
FIG. 5 is a structural block diagram of a terminal according to some embodiments of the present disclosure.

FIG. 5 is a schematic diagram of a hardware structure of a terminal according to some embodiments of the present disclosure.

The terminal 50 includes but is not limited to: a radio frequency unit 510, a network module 520, an audio output unit 530, an input unit 540, a sensor 550, a display unit 560, a user input unit 570, an interface unit 580, a memory 590, a processor 511, and a power supply 512. A person skilled in the art may understand that the structure of the terminal shown in FIG. 5 does not constitute a limitation on the terminal, and the terminal may include more or fewer components than those shown in the figure, or combine some components, or have different component arrangements. In some embodiments of the present disclosure, the terminal includes but is not limited to a mobile phone, a tablet computer, a notebook computer, a palmtop computer, an in-vehicle terminal, a wearable device, a pedometer, and the like.

In a case that a network side device needs to perform early data transmission EDT and the terminal is in a radio resource control RRC idle state or an RRC inactive state, in a random access process with the network side device, the radio frequency unit 510 is configured to receive EDT data sent by the network side device and the processor 511 performs RRC state switching.

The terminal in some embodiments of the present disclosure receives the EDT data sent by the network side device in the random access process, so that the data transmission delay is reduced, the system efficiency is improved, and the reliability of network communication is ensured.

It should be understood that in some embodiments of this disclosure, the radio frequency unit 510 may be configured to receive and send signals in a process of receiving and sending information or calling. Specifically, the radio frequency unit receives downlink data from a network side device for processing by the processor 511, and sends uplink data to the network side. Generally, the radio frequency unit 510 includes, but is not limited to, an antenna, at least one amplifier, a transceiver, a coupler, a low noise amplifier, a duplexer, and the like. In addition, the radio frequency unit 510 may also communicate with another device via a wireless communications system and network.

The terminal provides a user with wireless broadband Internet access by using the network module 520, for example, helping the user receive and send an email, browse a web page, and access streaming media.

The audio output unit 530 may convert audio data received by the radio frequency unit 510 or the network module 520 or stored in the memory 590 into an audio signal, and output the audio signal into sound. In addition, the audio output unit 530 may further provide an audio output (for example, a call signal received voice, or a message received voice) related to a specific function implemented by the terminal 50. The audio output unit 530 includes a loudspeaker, a buzzer, a receiver, and the like.

The input unit 540 is configured to receive audio or radio frequency signals. The input unit 540 may include a graphics processing unit (Graphics Processing Unit, GPU) 541 and a microphone 542. The graphics processing unit 541 processes image data of a static picture or video obtained by an image capture apparatus (such as a camera) in a video capture mode or an image capture mode. A processed image frame may be displayed on the display unit 560. The image frame processed by the graphics processing unit 541 may be stored in the memory 590 (or another storage medium) or sent by using the radio frequency unit 510 or the network module 520. The microphone 542 may receive a sound and can process such sound into audio data. The processed audio data may be output by being converted into a format that may be sent to a mobile communications network device by using the radio frequency unit 510 in a telephone call mode.

The terminal 50 further includes at least one sensor 550, such as a light sensor, a motion sensor and other sensors. Specifically, the optical sensor includes an ambient optical sensor and a proximity sensor. The ambient optical sensor can adjust a brightness of a display panel 561 based on a brightness of ambient light. The proximity sensor can close the display panel 561 and/or backlight when the terminal 50 moves to an ear. As a type of motion sensor, an accelerometer sensor can detect magnitudes of accelerations in all directions (usually three axes), can detect a magnitude and a direction of gravity in a static state, and can be applied to terminal posture recognition (such as screen switching between portrait and landscape, related games, and magnetometer posture calibration), functions related to vibration recognition (such as pedometer and tapping), and the like. The sensor 550 may also include a fingerprint sensor, a pressure sensor, an iris sensor, a molecular sensor, a gyroscope, a barometer, a hygrometer, a thermometer, an infrared sensor, and the like. Details are not described herein.

The display unit 560 is configured to display information entered by a user or information provided for the user. The display unit 560 may include the display panel 561, and the display panel 561 may be configured in a form of a liquid crystal display (Liquid Crystal Display, LCD), an organic light-emitting diode (Organic Light-Emitting Diode, OLED), or the like.

The user input unit 570 may be configured to receive input digit or character information, and generate key signal inputs related to user settings and function control of the terminal. Specifically, the user input unit 570 includes a touch panel 571 and another input device 572. The touch panel 571 is also referred to as a touchscreen, and may collect a touch operation performed by a user on or near the touch panel 571 (such as an operation performed by a user on the touch panel 571 or near the touch panel 571 by using any proper object or accessory, such as a finger or a stylus). The touch panel 571 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 511, and receives and executes a command from the processor 511. In addition, the touch panel 571 may be implemented as a resistive type, a capacitive type, an infrared type, a surface acoustic wave type, or the like. In addition to the touch panel 571, the user input unit 570 may further include another input device 572. Specifically, the another input device 572 may include but is not limited to one or more of a physical keyboard, a function key (such as a volume control key or an on/off key), a trackball, a mouse, a joystick, and the like. Details are not described herein.

Further, the touch panel 571 can cover the display panel 561. When detecting a touch operation on or near the touch panel 571, the touch panel 571 transmits the touch operation to the processor 511 to determine a type of a touch event. Then, the processor 511 provides corresponding visual output on the display panel 561 based on the type of the touch event. Although in FIG. 5, the touch panel 571 and the display panel 561 implement input and output functions of the terminal as two independent components, in some embodiments, the touch panel 571 and the display panel 561 may be integrated to implement the input and output functions of the terminal. This is not specifically limited herein.

The interface unit 580 is an interface connecting an external apparatus and the terminal 50. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 580 may be configured to receive an input (for example, data information or power) from an external apparatus and transmit the received input to one or more elements in the terminal 50, or transmit data between the terminal 50 and the external apparatus.

The memory 590 may be configured to store a software program as well as various types of data. The memory 590 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 590 may include a high-speed random access memory or a nonvolatile memory, for example, at least one magnetic disk storage device, a flash memory, or another volatile solid-state storage device.

The processor 511 is a control center of the terminal, and is connected to all parts of the entire terminal by using various interfaces and lines, and performs various functions of the terminal and processes data by running or executing the software program and/or a module that are stored in the memory 590 and invoking the data stored in the memory 590, to implement overall monitoring on the terminal. The processor 511 may include one or more processing units. Optionally, the processor 511 may integrate an application processor with a modem processor. The application processor mainly processes the operating system, a user interface, the application program, and the like. The modem processor mainly processes wireless communication. It can be understood that alternatively, the modem processor may not be integrated into the processor 511.

The terminal 50 may further include a power supply 512 (for example, a battery) that supplies power to each component. Optionally, the power supply 512 may be logically connected to the processor 511 by using a power management system, to implement functions such as charging, discharging, and power consumption management by using the power management system.

In addition, the terminal 50 includes some function modules that are not shown, and details are not provided herein.

Optionally, some embodiments of the present disclosure further provide a terminal, including a processor 511, a memory 590, and a computer program that is stored in the memory 590 and that can run on the processor 511. When the computer program is executed by the processor 511, each process of the foregoing data receiving method embodiment applied to a terminal side can be implemented, and a same technical effect can be achieved. To avoid repetition, details are not described herein.

Some embodiments of the present disclosure further provide a computer-readable storage medium. A computer program is stored in the computer-readable storage medium. When being executed by a processor, the computer program implements each process of the foregoing data receiving method embodiment applied to a terminal side, and a same technical effect can be achieved. To avoid repetition, details are not described herein. The computer-readable storage medium includes a read-only memory (Read-only Memory, ROM for short), a random access memory (Random Access Memory, RAM for short), a magnetic disk, an optical disc, or the like.

Figure 6:
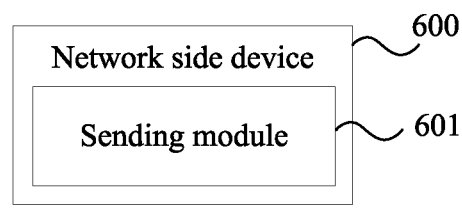
FIG. 6 is a schematic diagram of modules of a network side device according to some embodiments of the present disclosure.

As shown in FIG. 6, some embodiments of the present disclosure further provide a network side device 600, including:

a sending module 601, configured to: in a case that a network side device needs to perform early data transmission EDT and a terminal is not in a radio resource control RRC idle state or an RRC inactive state, in a random access process with the terminal, send EDT data to the terminal and instruct the terminal to perform RRC state switching.

Optionally, the sending module 601 is configured to:

add the EDT data to an RRC connection setup message and send the RRC connection setup message to the terminal.

Further, the RRC connection setup message includes a non-access stratum dedicated information indicator field, and the EDT data is located in the non-access stratum dedicated information indicator field.

Optionally, the sending module 601 is configured to:

send the radio resource control RRC connection setup message and an RRC early data complete message together to the terminal;

where the RRC early data complete message carries the EDT data.

Further, the RRC early data complete message precedes the RRC connection setup message.

Further, the network side device further includes:

an indication sending module, configured to send message execution sequence indication information to the terminal;

where the message execution sequence indication information is used to instruct the terminal to first obtain the EDT data in the RRC early data complete message, and then perform state switching according to the RRC connection setup message; or the message execution sequence indication information is used to instruct the terminal to first perform state switching according to the RRC connection setup message, and then obtain the EDT data in the RRC early data complete message.

Further, the RRC early data complete message and the RRC connection setup message are marked with different logical channel identifiers.

Further, the RRC early data complete message carries first indication information, and the first indication information is used to instruct the terminal to obtain the EDT data according to the RRC early data complete message.

Some embodiments of the present disclosure further provide a network side device, including a memory, a processor, and a computer program stored in the memory and executable on the processor. When the computer program is executed by the processor, each process of the embodiment of the data sending method applied to the network side device can be implemented, and a same technical effect can be achieved. To avoid repetition, details are not described herein.

Some embodiments of the present disclosure further provide a computer-readable storage medium. The computer-readable storage medium stores a computer program, and when the computer program is executed by a processor, each processes of the embodiment of the data sending method applied to the network side device is implemented and a same technical effect can be achieved. To avoid repetition, details are not described herein again. The computer readable storage medium is, for example, a read-only memory (ROM for short), a random access memory (RAM for short), a magnetic disk, or an optical disc.

Figure 7:
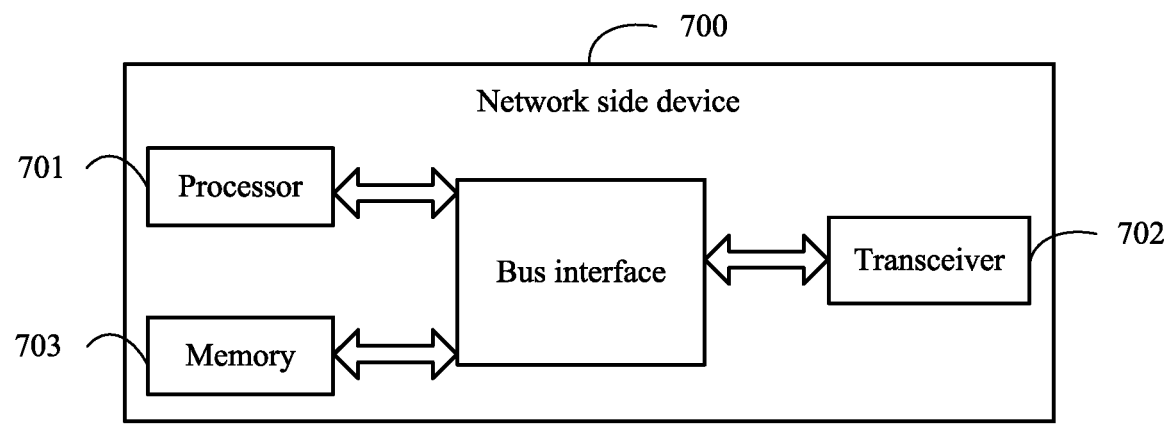
FIG. 7 is a structural block diagram of a network side device according to some embodiments of the present disclosure.

FIG. 7 is a structural diagram of a network side device according to an embodiment of the present disclosure, and the network side device can implement details of the foregoing data sending method and achieve a same effect. As shown in FIG. 7, the network side device 700 includes a processor 701, a transceiver 702, a memory 703, and a bus interface.

The processor 701 is configured to read a program in the memory 703, to perform the following processes:

in a case that a network side device needs to perform early data transmission EDT and a terminal is not in a radio resource control RRC idle state or an RRC inactive state, in a random access process with the terminal, sending EDT data to the terminal and instructing the terminal to perform RRC state switching.

In FIG. 7, the bus architecture may include any number of interconnected buses and bridges, which are specifically connected together by various circuits of one or more processors represented by the processor 701 and a memory represented by the memory 703. The bus architecture may further link various other circuits such as those of a peripheral device, a voltage regulator, and a power management circuit. These are well known in the art, and therefore are not further described in this specification. The bus interface provides an interface. The transceiver 702 may be a plurality of elements, in other words, include a transmitter and a receiver, and provide a unit for communicating with various other devices on a transmission medium.

Optionally, the processor 701 is configured to read a program in the memory 703 for sending EDT data corresponding to early data transmission to the terminal, to perform the following process:

adding the EDT data to an RRC connection setup message and send the RRC connection setup message to the terminal through the transceiver 702.

Further, the RRC connection setup message includes a non-access stratum dedicated information indicator field, and the EDT data is located in the non-access stratum dedicated information indicator field.

Optionally, the processor 701 is configured to read a program in the memory 703 for sending EDT data to the terminal, to perform the following process:

sending the radio resource control RRC connection setup message and an RRC early data complete message together to the terminal through the transceiver 702;

where the RRC early data complete message carries the EDT data.

Further, the RRC early data complete message precedes the RRC connection setup message.

Further, the processor 701 is configured to read a program in the memory 703, to perform the following process:

sending message execution sequence indication information to the terminal through the transceiver 702;

where the message execution sequence indication information is used to instruct the terminal to first obtain the EDT data in the RRC early data complete message, and then perform state switching according to the RRC connection setup message; or the message execution sequence indication information is used to instruct the terminal to first perform state switching according to the RRC connection setup message, and then obtain the EDT data in the RRC early data complete message.

Further, the RRC early data complete message and the RRC connection setup message are marked with different logical channel identifiers.

Further, the RRC early data complete message carries first indication information, and the first indication information is used to instruct the terminal to obtain the EDT data according to the RRC early data complete message.

The network side device may be a base transceiver station (Base Transceiver Station, BTS for short) in a Global System for Mobile Communications (Global System of Mobile communication, GSM) or Code Division Multiple Access (Code Division Multiple Access, CDMA), or may be a NodeB (NodeB, NB) in Wideband Code Division Multiple Access (Wideband Code Division Multiple Access, WCDMA), or may be an evolved NodeB (evolved NodeB, eNB or eNodeB for short) in LTE, or a relay station or an access point, or a base station in a future 5G network, which is not limited herein.

It may be understood that the embodiments described in some embodiments of the present disclosure may be implemented by hardware, software, firmware, middleware, microcode, or a combination thereof. For implementation with hardware, the module, unit, submodule, and subunit may be implemented in one or more application specific integrated circuits (Application Specific Integrated Circuits, ASIC), a digital signal processor (Digital Signal Processing, DSP), a digital signal processing device (DSP Device, DSPD), a programmable logic device (Programmable Logic Device, PLD), a field-programmable gate array (Field-Programmable Gate Array, FPGA), general processors, controllers, micro-controllers, micro-processors, and other electronic units for implementing the functions of the present application, or their combinations.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. A data receiving method, applied to a terminal and comprising:

in a case that a network side device needs to perform early data transmission EDT and the terminal is in a radio resource control RRC idle state or an RRC inactive state, in a random access process with the network side device, receiving EDT data sent by the network side device and performing RRC state switching;

wherein the receiving EDT data sent by the network side device comprises:

receiving an RRC connection setup message and an RRC early data complete message that are sent together by the network side device;

wherein the RRC early data complete message carries the EDT-data data, the RRC early data complete message precedes the RRC connection setup message;

wherein the receiving EDT data sent by the network side device and performing RRC state switching comprises:

obtaining the EDT data in the RRC early data complete message, skipping, by the terminal, performing an operation of entering an idle state, and performing state switching according to the RRC connection setup message.

2. The data receiving method according to claim 1, wherein the receiving EDT data sent by the network side device comprises:

receiving an RRC connection setup message sent by the network side device;

wherein the RRC connection setup message carries the EDT data.

3. The data receiving method according to claim 2, wherein the RRC connection setup message comprises a non-access stratum dedicated information indicator field, and the EDT data is located in the non-access stratum dedicated information indicator field.

4. The data receiving method according to claim 1, further comprising:
receiving message execution sequence indication information sent by the network side device;
wherein the message execution sequence indication information is used to instruct the terminal to first obtain the EDT data in the RRC early data complete message, and then perform state switching according to the RRC connection setup message; or
the message execution sequence indication information is used to instruct the terminal to first perform state switching according to the RRC connection setup message, and then obtain the EDT data in the RRC early data complete message.

5. The data receiving method according to claim 1, wherein the RRC early data complete message and the RRC connection setup message are marked with different logical channel identifiers.

6. The data receiving method according to claim 1, wherein the RRC early data complete message carries first indication information, and the first indication information is used to instruct the terminal to obtain the EDT data according to the RRC early data complete message.

7. The data receiving method according to claim 1, wherein the skipping, by the terminal, performing an operation of entering an idle state comprises:
skipping, by the terminal, an operation of resetting a medium access control MAC entity.

8. A data sending method, applied to a network side device and comprising:
in a case that a network side device needs to perform early data transmission EDT and a terminal is in a radio resource control RRC idle state or an RRC inactive state, in a random access process with the terminal, sending EDT data to the terminal and instructing the terminal to perform RRC state switching;
wherein the sending EDT data to the terminal comprises:
sending the radio resource control RRC connection setup message and an RRC early data complete message together to the terminal;
wherein the RRC early data complete message carries the EDT data, the RRC early data complete message precedes the RRC connection setup message;
wherein the instructing the terminal to perform RRC state switching comprises:
instructing the terminal to obtain the EDT data in the RRC early data complete message, skip performing an operation of entering an idle state, and perform state switching according to the RRC connection setup message.

9. The data sending method according to claim 8, wherein the sending EDT data to the terminal comprises:
adding the EDT data to an RRC connection setup message and sending the RRC connection setup message to the terminal.

10. The data sending method according to claim 9, wherein the RRC connection setup message comprises a non-access stratum dedicated information indicator field, and the EDT data is located in the non-access stratum dedicated information indicator field.

11. The data sending method according to claim 8, further comprising:
sending message execution sequence indication information to the terminal;
wherein the message execution sequence indication information is used to instruct the terminal to first obtain the EDT data in the RRC early data complete message, and then perform state switching according to the RRC connection setup message; or
the message execution sequence indication information is used to instruct the terminal to first perform state switching according to the RRC connection setup message, and then obtain the EDT data in the RRC early data complete message.

12. The data sending method according to claim 8, wherein the RRC early data complete message and the RRC connection setup message are marked with different logical channel identifiers.

13. The data sending method according to claim 8, wherein the RRC early data complete message carries first indication information, and the first indication information is used to instruct the terminal to obtain the EDT data according to the RRC early data complete message.

14. A terminal, comprising: a memory, a processor, and a computer program stored in the memory and executable on the processor, wherein when the computer program is executed by the processor, the following steps are implemented:
in a case that a network side device needs to perform early data transmission EDT and the terminal is in a radio resource control RRC idle state or an RRC inactive state, in a random access process with the network side device, receiving EDT data sent by the network side device and performing RRC state switching;
wherein the receiving EDT data sent by the network side device comprises:
receiving an RRC connection setup message and an RRC early data complete message that are sent together by the network side device;
wherein the RRC early data complete message carries the EDT data, the RRC early data complete message precedes the RRC connection setup message;
wherein the receiving EDT data sent by the network side device and performing RRC state switching comprises:
obtaining the EDT data in the RRC early data complete message, skipping, by the terminal, performing an operation of entering an idle state, and performing state switching according to the RRC connection setup message.

15. The terminal according to claim 14, wherein the receiving EDT data sent by the network side device comprises:
receiving an RRC connection setup message sent by the network side device; wherein the RRC connection setup message carries the EDT data.

* * * * *